(12) United States Patent
Schlipf et al.

(10) Patent No.: US 12,454,346 B2
(45) Date of Patent: Oct. 28, 2025

(54) TRAILING EDGE SYSTEM FOR A WING OF AN AIRCRAFT, METHOD OF OPERATING CONTROL SURFACES OF AN AIRCRAFT, AIRCRAFT WING AND AIRCRAFT

(71) Applicant: Airbus Operations GmbH, Hamburg (DE)

(72) Inventors: Bernhard Schlipf, Hamburg (DE); Jan Haunert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/454,406

(22) Filed: Aug. 23, 2023

(65) Prior Publication Data

US 2024/0076030 A1 Mar. 7, 2024

(30) Foreign Application Priority Data

Sep. 1, 2022 (EP) .................................... 22193566

(51) Int. Cl.
*B64C 9/10* (2006.01)
*B64C 7/00* (2006.01)
*B64C 13/30* (2006.01)

(52) U.S. Cl.
CPC .................. *B64C 9/10* (2013.01); *B64C 7/00* (2013.01); *B64C 13/30* (2013.01)

(58) Field of Classification Search
CPC .... B64C 9/02; B64C 9/04; B64C 9/06; B64C 9/10; B64C 9/12; B64C 9/20; B64C 13/28

See application file for complete search history.

(56) References Cited

U.S. PATENT DOCUMENTS

| 2,156,994 | A |   | 5/1939  | Victor         |           |
|-----------|---|---|---------|----------------|-----------|
| 2,262,968 | A |   | 11/1941 | Rudolf et al.  |           |
| 3,528,632 | A | * | 9/1970  | Putman ........ | B64C 9/16 |
|           |   |   |         |                | 244/215   |
| 4,180,224 | A |   | 12/1979 | Ryle, Jr.      |           |
| 4,688,744 | A | * | 8/1987  | Aldrich ...... | F16H 1/28 |
|           |   |   |         |                | 74/411    |

(Continued)

FOREIGN PATENT DOCUMENTS

| CA | 3023318 A1 | * | 7/2019 | ............. B64C 13/28 |
| EP | 0937642 A2 | * | 8/1999 | |

(Continued)

OTHER PUBLICATIONS

European Search Report for corresponding European Patent Application No. 22193566 dated Feb. 10, 2023.

*Primary Examiner* — Joshua D Huson
*Assistant Examiner* — Anna L. Gordon
(74) *Attorney, Agent, or Firm* — Greer, Burns & Crain, Ltd.

(57) ABSTRACT

A trailing edge system for a wing of an aircraft comprises a flap device arrangement configured for being mounted at a trailing edge of an aircraft wing, wherein at least two movable flap devices of the flap device arrangement are spaced apart from each other. A torque element is connecting the movable flap devices for transmitting a torque to the movable flap devices in order to actuate a rotational movement of the movable flap devices. An actuator for rotationally driving the torque element is provided. Also a method of operating control surfaces of an aircraft wing and an aircraft and aircraft wing with such a system.

12 Claims, 3 Drawing Sheets

(56) References Cited

U.S. PATENT DOCUMENTS

| | | | |
|---|---|---|---|
| 10,017,243 B2 | 7/2018 | Moser et al. | |
| 2014/0346282 A1* | 11/2014 | Aljets | B64C 9/16 |
| | | | 244/213 |
| 2022/0212782 A1* | 7/2022 | Huynh | B64C 9/20 |

FOREIGN PATENT DOCUMENTS

| | | | |
|---|---|---|---|
| EP | 2851287 B1 | 11/2018 | |
| FR | 2600035 A1 * | 12/1987 | |
| GB | 525400 A | 8/1940 | |
| GB | 576093 A | 3/1946 | |
| GB | 584700 A * | 1/1947 | |
| WO | WO-0108971 A1 * | 2/2001 | B64C 13/50 |

* cited by examiner

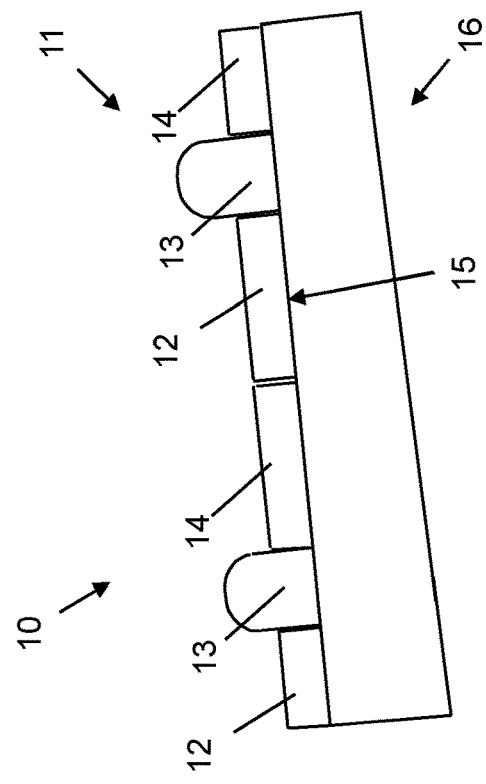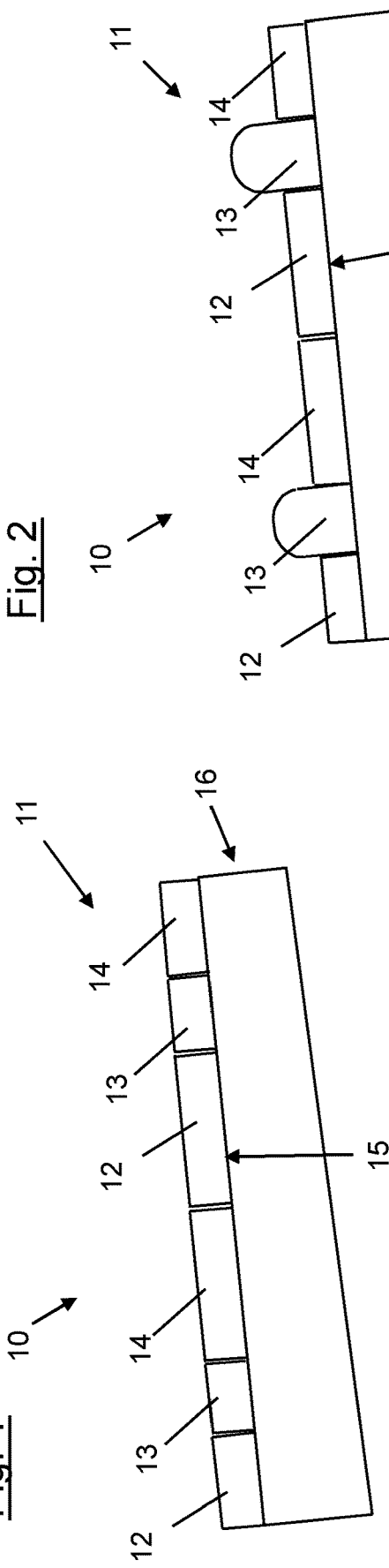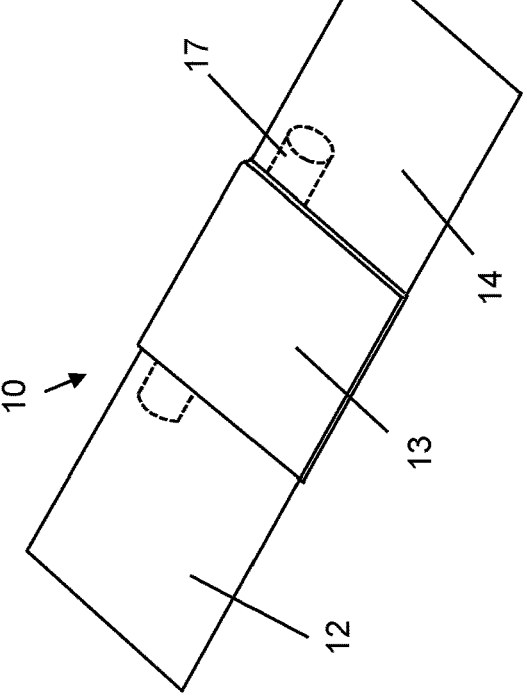

TRAILING EDGE SYSTEM FOR A WING OF AN AIRCRAFT, METHOD OF OPERATING CONTROL SURFACES OF AN AIRCRAFT, AIRCRAFT WING AND AIRCRAFT

CROSS-REFERENCES TO RELATED APPLICATIONS

This application claims the benefit of European Patent Application 22193566.1 filed on Sep. 1, 2022, the entire disclosure of which is incorporated herein by way of reference.

FIELD OF THE INVENTION

The invention relates to a trailing edge system for a wing of an aircraft, a method of operating control surfaces of an aircraft, an aircraft wing and an aircraft.

BACKGROUND OF THE INVENTION

Aircrafts and in particular commercial aircrafts typically comprise various control surfaces as part of their wings or mounted on the wings. The control surfaces or control devices usually comprise leading edge devices positioned at the leading edge of a wing and trailing edge devices positioned at the trailing edge of the wing. Trailing edge devices may comprise e.g. flaps, ailerons, flaperons and others, each having a specific function and influencing the aerodynamic behavior and performance of the aircraft.

In order to react to gusts and for flutter suppression, quickly movable trailing edge elements are necessary. Since flaps which are deflected in particular during landing are moving relatively slowly, there is a need for quickly movable trailing edge elements.

EP 2 851 287 B1 discloses a trailing edge system comprising an adaptive trailing edge element, an electric motor actuator configured to actuate the adaptive trailing edge element, a linkage system coupling the electric motor actuator to the adaptive trailing edge element, and a damper for damping vibrations of matter that may be aerodynamically induced in the adaptive trailing edge element.

Flaps are usually actuated by a fairing which comprise the kinematics for moving a flap or a number of flaps. This concept is commonly used e.g. in commercial aircrafts. However, it has been turned out that it needs relatively large efforts to additionally provide the actuation and kinematics for moving quickly movable trailing edge elements in order to react directly gusts and/or to suppress flutter. Such quickly moving trailing edge elements are specific flaps and may also be called tabs or mini tabs

SUMMARY OF THE INVENTION

It is an object of the invention to provide a trailing edge system for an aircraft, comprising control surfaces which can be moved quickly to react to gusts, wherein a negative influence of the trailing edge system on the aerodynamic performance of the aircraft shall be minimized.

The object may achieved by the trailing edge system according to aspects of the invention described herein including by a method of operating control surfaces of an aircraft according to one or more embodiments. Further advantageous embodiments are also disclosed.

According to a first aspect, the invention provides a trailing edge system for a wing of an aircraft, comprising: a flap device arrangement configured for being mounted at a trailing edge of an aircraft wing, wherein at least two movable flap devices of the flap device arrangement are spaced apart from each other; a torque element connecting the movable flap devices for transmitting a torque to the movable flap devices in order to actuate a rotational movement of the movable flap devices; and an actuator for rotationally driving the torque element.

Preferably, the torque element extends through or under a non-actuated part for transmitting a rotational force to the movable flap devices.

Preferably, the non-actuated part is configured as a non-actuated flap device arranged between the movable flap devices which are actuated by the torque element.

Preferably, the torque element is configured as a torque tube.

Preferably, the torque element is mounted off-center or out-centered to the axis of rotation of the movable flap devices.

Preferably, the torque element is mounted in the area of a fairing and/or within a fairing, wherein the movable flap devices actuated by the torque element are arranged on both sides of the fairing.

Preferably, the non-actuated flap device is arranged in the area of the fairing.

Preferably, different parts of the fairing can be actuated by the same actuator through the torque element.

Preferably, the flap devices of the flap device arrangement are configured as tab devices for being mounted at the rear end of a flap of the wing.

Preferably, the non-actuated part is fixed relative to a movable part of the fairing and only moved synchronously together with the flap of the wing.

According to a second aspect, the invention provides a method of operating control surfaces of an aircraft wing, comprising: actuating a flap device arrangement mounted at a trailing edge of an aircraft wing, the flap device arrangement comprising at least two movable flap devices which are spaced apart from each other and forming control surfaces, wherein a torque element connecting the movable flap devices transmits a torque to the movable flap devices for actuating a preferably synchronous rotational movement of the movable flap devices, and wherein an actuator is rotationally driving the torque element.

Preferably, a trailing edge system according to the invention is used in the method.

According to a third aspect, the invention provides an aircraft wing, comprising a trailing edge system according to the invention and/or being operated by the method according to the invention.

According to a fourth aspect, the invention provides an aircraft comprising a wing according to the invention.

Characteristics and advantages described in relation to the trailing edge system are also related to the method of operating control surfaces, and vice versa. The same applies for the wing and the aircraft.

In particular, the invention provides an actuated flap trailing edge for highlift aerodynamics. For example, a torque tube is connecting multiple moving rear wing flap devices through a non-actuated part with a transfer of force.

In case of an actuated flap trailing edge segment or tab, the tab can be non-actuated in the area of a fairing. Particularly IB (Inboard) and OB (Outboard) part of the fairing can be actuated by the same actuator through the torque tube.

Particularly, multiple moving rear wing flap devices can be built, with a non-actuated part to fit e.g. a fairing without interference problems with rear wing flap devices. Another advantage is reuse of actuator force e.g. at a fairing split.

BRIEF DESCRIPTION OF THE DRAWINGS

In the following, exemplary embodiments of the invention showing further advantages and characteristics are described in detail with reference to the figures, in which:

FIG. 1 shows a schematic top view of a wing flap with multiple trailing edge segments comprising moving and non-moving parts;

FIG. 2 shows a top view of a wing flap with multiple trailing segments near the fairings of the wing;

FIG. 3 shows a schematic top view on trailing action elements connected by a torque tube;

In the figures, similar or identical elements and features are designated by the same reference numbers. The features, functions and advantages discussed herein and shown in the embodiments can be achieved independently and combined in other embodiments.

DETAILED DESCRIPTION OF THE PREFERRED EMBODIMENTS

Figure 5:
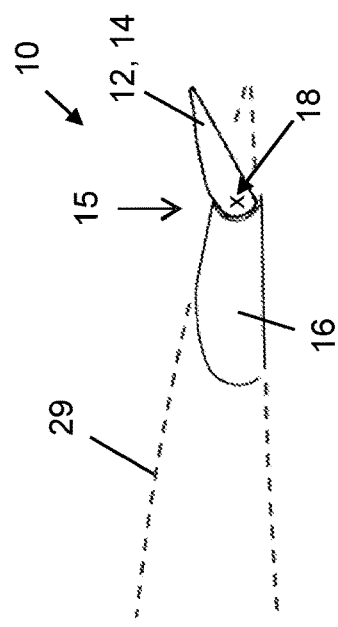
FIG. 5 shows a schematic sectional view along the line A-A of FIG. 4.

FIG. 1 shows a general view of a flap device arrangement 11 provided in a trailing edge system 10 according to a preferred embodiment of the invention. The flap device arrangement 11 comprises a number of flap devices 12, 13, 14 configured as tabs or tab devices and mounted at the rear end 15 of a flap 16 of an aircraft wing. The flap or tab devices 12, 13, 14 are configured as trailing edge segments and comprise actuated flap devices 12, 14 and non-actuated flap devices 13 arranged between them. Thus, each pair of actuated flap devices 12, 14 is interrupted by a non-actuated part or flap device segment 13. In this way, the wing flap 16 comprises multiple trailing edge segments 12, 14 divided through non-moving parts 13.

FIG. 2 depicts a portion of the trailing edge of an aircraft wing similar to that shown in FIG. 1. Also here, the flap devices 12, 13, 14 are configured as trailing edge segments mounted to the rear edge of wing flap 16. The non-actuated flap or tab devices 13 are each mounted in the area of a fairing which is not visible in this figure.

As depicted in FIG. 3, a torque element 17 of the trailing edge system 10 is configured as a torque tube 17 and connecting the movable parts or flap devices 12, 14 discussed above for transmitting a torque in order to activate rotational movement of the parts 12, 14 around an axis of rotation which is parallel to the axis of rotation of the torque tube 17. The non-moving part or flap device 13 which is not actuated by torque tube 17 covers the torque tube 17 on its upper side. For reasons of clarity, in order to show the position and alignment of torque tube 17, upper parts of the movable flap devices 12, 14 covering the torque tube 17 on the upper side are omitted in this figure.

Figure 4:
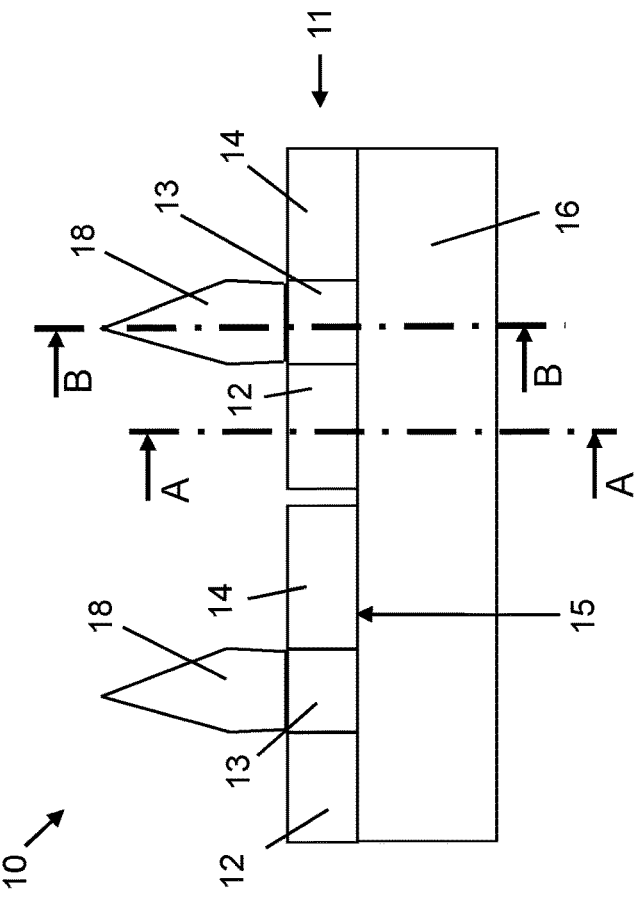
FIG. 4 shows a schematic top view of a wing flap comprising a flap device arrangement in the area of fairings.
Figure 6:
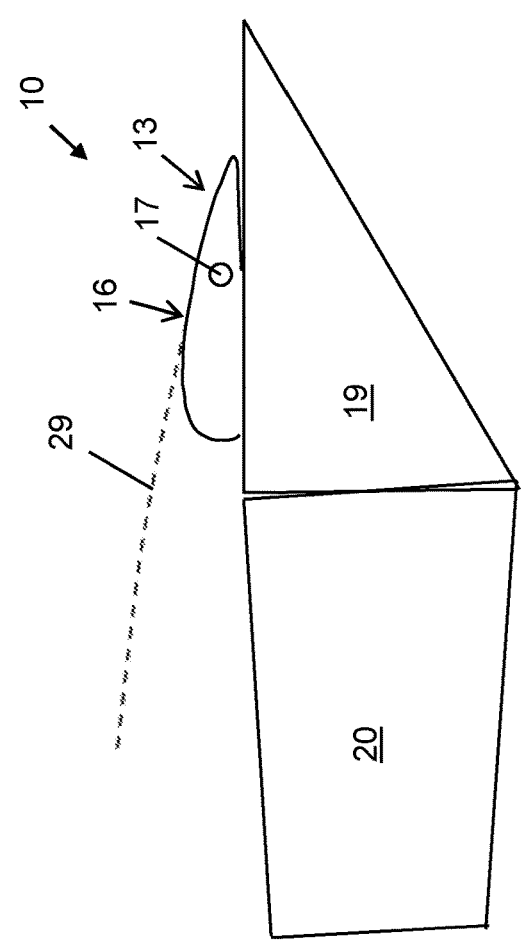
FIG. 6 shows a schematic sectional view along the line B-B of FIG. 4.

Referring to FIGS. 4 to 6 now, further details of the trailing edge system 10 according to a preferred embodiment of the invention are discussed.

FIG. 4 shows a top view on the flap 16 of a wing comprising the flap device arrangement 11 in the area of two fairings 18. As described above, each non-actuated tab or flap device 13 is located between two actuated tab or flap devices 12, 14 arranged on both sides of it. Each non-moving flap device or part 13 is partially covering one of the fairings 18 on its upper side. Actuated and non-actuated trailing edge devices 12, 13, 14 are forming the flap device arrangement 11 and are mounted at the rear edge 15 of wing flap 16.

FIG. 5 depicts a sectional view of the trailing edge arrangement 10 shown in FIG. 4 along line A-A of FIG. 4. The actuated trailing edge or flap device 12, 14 positioned at the rear edge 15 of flap 16 is deflected upwards in this example by a rotational movement around its axis of rotation (e.g., extending lengthwise along a length of the flap 16). It is actuated by torque tube 17 as shown in FIGS. 3 and 6, to which it is connected. That rotation of torque tube 17 causes rotation of the actuated tab device 12, 14 for deflecting it upwards or downwards from the trailing edge of wing 29.

FIG. 6 shows a sectional view along line B-B of FIG. 4. The non-moving part or flap device 13 is mounted on a movable part 19 of fairing 18, together with wing flap 16. The movable part 19 of fairing 18 is connected to a fixed part 20 of fairing 18 by fairing kinematics not shown in this figure, in order to move and deflect wing flap 16 together with non-actuated part or flap device 13. Torque tube 17 extends through the non-actuated tab or flap device 13 and transmits a torque from an actuator to the movable flap devices 12, 14.

Figure 7:
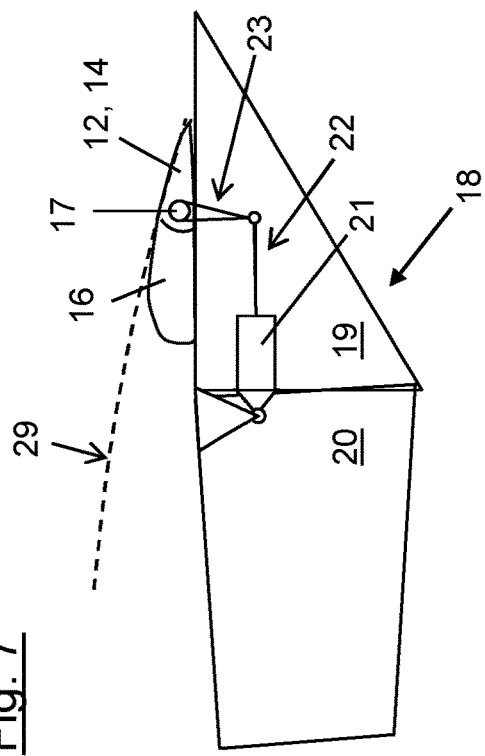
FIG. 7 shows a schematic partial sectional view of a fairing comprising an activation system for removing a flap device arrangement.

Referring now to FIG. 7, a preferred example of the kinematics for moving the actuated flap devices 12, 14 is discussed.

An actuator 21 is arranged within fairing 18 and mounted with one end to the fixed fairing part 20. The other end of actuator 21 comprising a linkage 22 and a rotary lever 23 is extending within the movable fairing part 19 and attached to torque tube 17 in a way to actuate a rotation of torque tube 17.

Above the movable part 19 of fairing 18, torque tube 17 extends through non-actuated flap device 13 positioned on fairing 18, which is not shown in this figure for clarity reasons. The ends of rotatable torque tube 17 are connected to actuated flap devices 12, 14 located at both sides of fairing 18 and of non-actuated flap device 13 mounted thereon.

Since the movable part 19 of fairing 18 is moved together with the support of flap device arrangement 11, a further movable part being arranged behind it which would result in aerodynamic disadvantages can be avoided, as well as very complex solutions.

Figure 8:
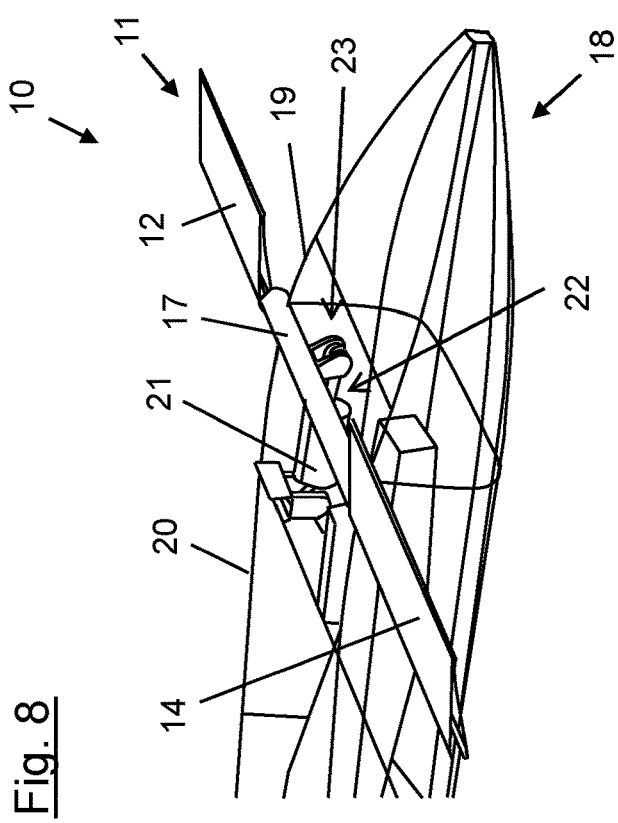
FIG. 8 shows a schematic perspective view of the trailing edge system mounted to the fairing, wherein parts are omitted for showing the activation.
Figure 9:
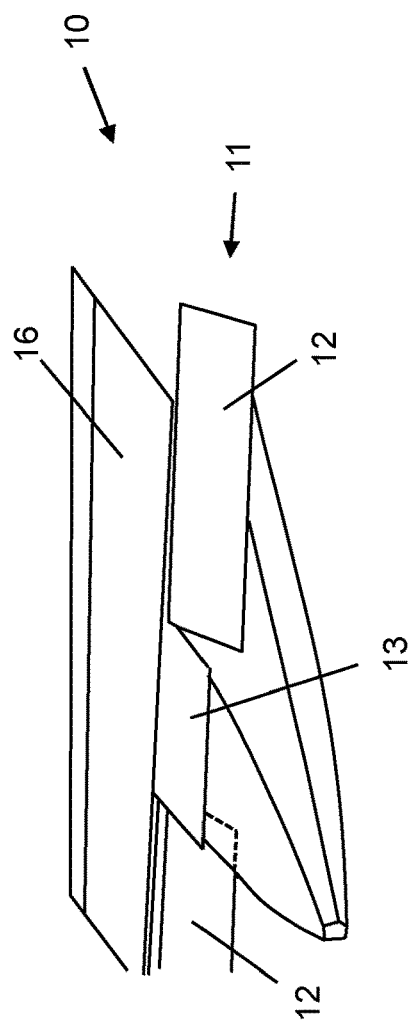
FIG. 9 shows a schematic perspective view on trailing edge of the wing comprising a fairing and the trailing edge system according to a preferred embodiment of the invention.

FIGS. 8 and 9 show schematic perspective view is of the trailing edge system 10 according to a particularly preferred embodiment of the invention.

In FIG. 8, the wing flap 16 and the non-actuated tab or flap device 13 covering fairing 18 are omitted in order to allow an inside view of the fairing 18 in which the actuation mechanism is integrated. FIG. 9 shows a view of the trailing edge of the wing, including wing flap 16 at which the flap device arrangement 11 is mounted.

The trailing edge system 10 comprises the features as discussed above with reference to FIGS. 1 to 7. Actuator 21 is connected to torque tube 17 by linkage 22 and rotary lever 23 in order to cause a rotational movement of torque tube 17.

The actuator 21 is formed as a cylinder and configured as a linear actuator in this specific example, but it may also be for example a hydraulic actuator or an electric spindle drive or any other actuator which is acting fast.

Since torque tube 17 is engaged with both movable flap devices 12, 14, its rotational movement is transmitted to them so that they rotate around their axis of rotation when torque tube 17 rotates. The axis of rotation of actuated tab devices 12, 14 is located in their front part. The movable tabs 12, 14 are moving on the left and on the right side of non-actuated tab 13, which remains fixed in the fairing area and is moved only synchronously together with wing flap 16. In his way, a torsional coupling between the control surfaces provided by flap devices 12, 14 is achieved such that they are synchronously moved by the actuation mechanism. Torque element or tube 17 may be configured as a shaft.

A specific advantage is achieved by arranging the shaft or torque element 17 in a way that it is not centric to the axis of rotation of the movable tab devices 12, 14. By the non-centric or acentric arrangement, the shaft or torque tube 17 is not located around the rotational axis of the tab devices. By positioning the torque tube 17 outside the axis of rotation, the aerodynamics is even less disturbed or not disturbed at all. In particular, the torque element 17 is displaced downwards such that its axis of rotation is below the axis of rotation of tab devices 12, 14 to which it is connected. Thus, the aerodynamic on the upper side is even more optimized.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS

10 trailing edge system
11 flap device arrangement
12, 14 actuated flap devices/tabs
13 non-actuated flap devices/tabs
15 rear end of wing flap
16 wing flap/flap
17 torque element/tube
18 fairing
19 movable part of fairing
20 fixed part of fairing
21 actuator
22 linkage
23 rotary lever
29 wing

The invention claimed is:

1. A trailing edge system for a wing of an aircraft, the trailing edge system comprising:
a flap device arrangement configured to be mounted at a trailing edge of an aircraft wing, wherein the flap device arrangement comprises at least two movable tab devices spaced apart from each other and configured to be mounted at a rear end of a flap of the wing,
a fairing extending aft of the trailing edge of the aircraft wing and arranged in between the at least two movable tabs,
a torque element mounted within the fairing and connecting the at least two movable tab devices and configured to transmit a torque to the at least two movable tab devices in order to actuate a rotational movement of the at least two movable tab devices, and
an actuator for rotationally driving the torque element.

2. The trailing edge system according to claim 1, wherein the torque element extends through or under a non-actuated part for transmitting a force to the movable tab devices.

3. The trailing edge system according to claim 2, wherein the non-actuated part is configured as a non-actuated aerodynamic device mounted at the rear end of the flap of the wing, and is arranged between the at least two movable tab devices which are actuated by the torque element.

4. The trailing edge system according to claim 1, wherein the torque element is configured as a torque tube.

5. The trailing edge system according to claim 1, wherein the torque element is mounted off-center to an axis of rotation of the at least two movable tab devices.

6. The trailing edge system according to claim 1, wherein a non-actuated aerodynamic device is arranged in the area of the fairing.

7. The trailing edge system according to claim 1, wherein a movable part of the fairing and the at least two movable tab devices are configured to be actuated by the same actuator through the torque element.

8. The trailing edge system according to claim 1, wherein a non-actuated aerodynamic device is mounted to a movable part of the fairing together with the flap of the wing, and configured to move synchronously together with the flap of the wing.

9. An aircraft wing comprising:
the trailing edge system according to claim 1.

10. A method of operating control surfaces of an aircraft wing, the method comprising:
actuating a flap device arrangement mounted at a trailing edge of an aircraft wing, the flap device arrangement comprising at least two movable tab devices spaced apart from each other and which form control surfaces, wherein the at least two movable tab devices are configured to be mounted at a rear end of a flap of the wing,
wherein a torque element is mounted within a fairing extending aft of the trailing edge of the aircraft wing and arranged between the at least two movable tabs, the torque element connecting the at least two movable tab devices transmits a torque to the at least two movable tab devices for actuating a synchronous rotational movement of the at least two movable tab devices,
and wherein an actuator is rotationally driving the torque element.

11. The method according to claim 10, wherein a trailing edge system is provided, the trailing edge system comprising the flap device arrangement, the torque element, and the actuator.

12. An aircraft comprising:
the wing according to claim 9.

* * * * *